United States Patent [19]

Keeler, II

[11] 4,264,100
[45] Apr. 28, 1981

[54] AUTOMOTIVE SUN VISOR AND GLARE SCREEN

[75] Inventor: Miner S. Keeler, II, Grand Rapids, Mich.

[73] Assignee: Keeler Corporation, Grand Rapids, Mich.

[21] Appl. No.: 56,859

[22] Filed: Jul. 12, 1979

[51] Int. Cl.³ .................................................. B60J 3/06
[52] U.S. Cl. ................................... 296/97 G; 49/377
[58] Field of Search ........... 296/97 G, 97 R, 97 B, 296/97 T, 97 K; 15/250.1; 16/DIG. 3; 49/377

[56] References Cited

U.S. PATENT DOCUMENTS

| | | | |
|---|---|---|---|
| 2,112,726 | 3/1938 | Kemp | 296/97 R |
| 2,228,209 | 1/1941 | Harrington | 296/97 G |
| 2,239,240 | 4/1941 | Magness | 296/97 G |
| 2,385,557 | 9/1945 | Ward | 296/97 G |
| 2,422,863 | 6/1947 | Stroth | 296/97 G |
| 2,457,312 | 12/1948 | Kramer | 49/377 |
| 2,526,889 | 10/1950 | McComb | 296/97 R |
| 2,733,763 | 2/1956 | Nygaard | 296/97 G |
| 3,336,072 | 8/1967 | Leonard | 296/97 G |
| 3,355,761 | 12/1967 | Mayhew | 15/250.1 |
| 3,454,301 | 7/1969 | Lehmann | 296/97 R |

Primary Examiner—Robert R. Song
Attorney, Agent, or Firm—Price, Heneveld, Huizenga & Cooper

[57] ABSTRACT

An automotive windshield visor and glare screen is provided comprising an opaque windshield visor defining a compartment for storing a glare shield or light filter. The visor is pivotable about a longitudinally extending round wire pivot. The visor is pivotable upward to a stored position and downward to an operative position for shielding the operator's eyes from the sun. The glare screen extends from an opening in one longitudinal edge of the visor. Preferably, the round wire pivot and the opening from which the glare screen extends are adjacent the same longitudinal edge of the visor. The glare screen is slidably received in the compartment for deployment downward to an operative position for reducing glare when the visor is pivoted upward in its stored position. This allows the operator to alternately choose a sun visor or filter. First and second longitudinally extending wipers are slidably received in the visor. The wipers center the glare screen within the visor and clean the glare screen during reciprocal movement between deployed and stored positions.

5 Claims, 8 Drawing Figures

AUTOMOTIVE SUN VISOR AND GLARE SCREEN

BACKGROUND OF THE INVENTION

The invention relates generally to automotive windshield visors and more particularly, to a combination windshield visor and glare screen.

Combination automotive windshield visors and glare screens are found in the prior art. In the typical prior art combination visor and glare screen, the visor is hollow and the glare screen or filter is telescopically received therein. Means for pivotally mounting the visor above the windshield of the vehicle is provided whereby the visor may be pivoted upward to a first stored position and then downward to a second operative position where it shields the operator's eyes from the sun. In these prior art devices, the glare screen or filter extends from a longitudinal edge of the visor oppositely disposed from the pivotable end of the visor. Thus, the glare screen or filter can only be deployed along with the sun visor. That is to say, the sun visor has to be pivoted downward to its operative position before the glare screen telescopically received therein can be deployed. The operator does not have the option of using the visor alone or the glare screen alone and when deployed, the operator is generally required to view the road ahead through the glare screen. This can be a problem because glare screens often became smudged or soiled after frequent use.

SUMMARY OF THE INVENTION

According to the invention, these and other problems with the prior art are solved by provision of an automotive windshield visor having a glare shield and visor that may be alternately deployed and which include means for automatically cleaning the glare shield. The visor includes an opaque windshield visor body defining a compartment and first and second longitudinally extending edges. The body of the visor is provided with an opening extending along the first, or top, longitudinally extending edge of the visor. A translucent glare shield or filter is slidably received in the compartment and extends through the opening in the first longitudinal edge of the visor. Means for pivotally mounting the visor above the windshield of the vehicle is provided, the visor being pivotable about a longitudinal axis roughly corresponding to the first longitudinal edge of the visor. The visor is pivotable upward to a storage position and downward to an operative position for shielding the operator's eyes from the sun. Since the glare shield extends from the edge of the visor about which the visor is pivotable, the glare shield is deployed when the visor is pivoted upward in its stored position. The operative position of the glare shield roughly corresponds to the operative position of the visor and thus, the operator is not required to view the road ahead through the glare screen.

According to a more narrow aspect of the invention, first and second longitudinally extending channels are disposed on opposite sides of the opening through which the glare shield extends and first and second longitudinally extending wipers are slidably received in the first and second channels, respectively. The first and second wipers are in sliding contact with opposing sides of the glare screen for centering the glare screen within the opening and thus protecting it from being marred from contact with the visor. The wipers also clean the glare screen during reciprocal movement of the glare screen between stored and deployed positions. The wipers are each provided with a pull tab so that the wipers may be easily removed and replaced at the end of their service life.

DESCRIPTION OF THE PREFERRED EMBODIMENTS

Figure 1:
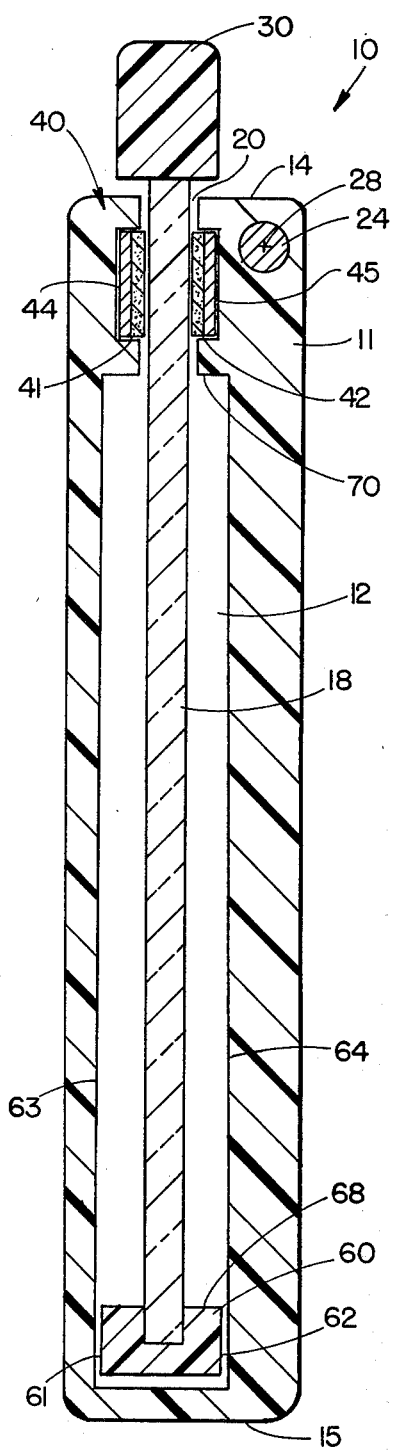
FIG. 1 is an elevational, sectional view of a visor and glare screen constructed according to the present invention.
Figure 2:
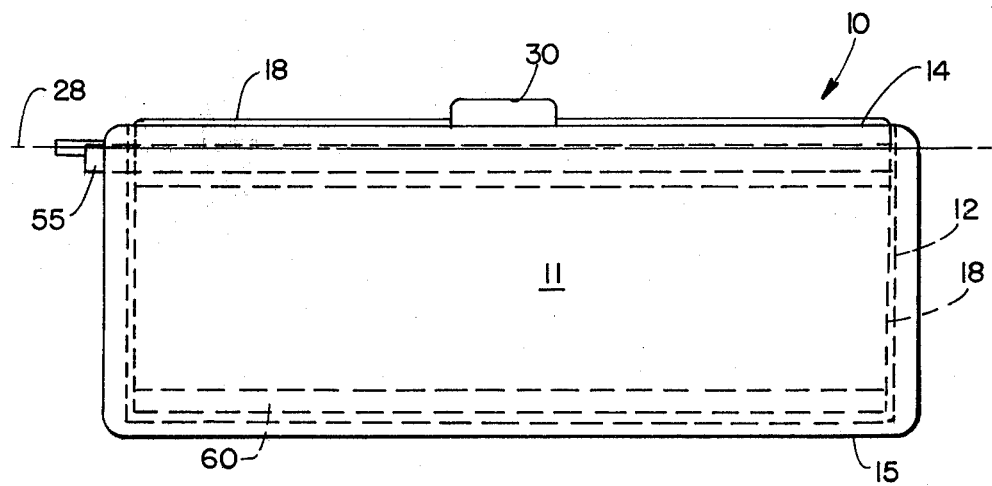
FIG. 2 is a plan view of the visor and glare shield of the present invention.

Referring to FIGS. 1 and 2, a combination windshield visor and glare screen 10 is illustrated. The windshield visor comprises an opaque body 11 generally formed from a suitable polymeric material. The body 11 of the visor defines a compartment 12 and first and second longitudinally extending edges 14 and 15. A translucent glare shield or light filter 18 is slidably received in the compartment 12. An opening 20 is disposed in the first or top longitudinal edge 14 of the body 11 of the visor, the opening 20 communicating with the compartment 12 of the visor. The translucent glare shield of filter 18 extends through the opening 20 in the first longitudinal edge 14 of the body of the visor.

Figure 3:
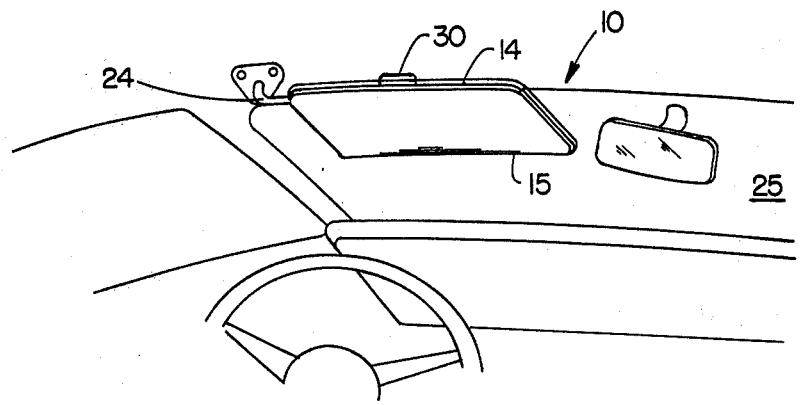
FIG. 3 is a perspective view of the visor and glare shield of the present invention mounted within an automotive vehicle, with the visor deployed.
Figure 4:
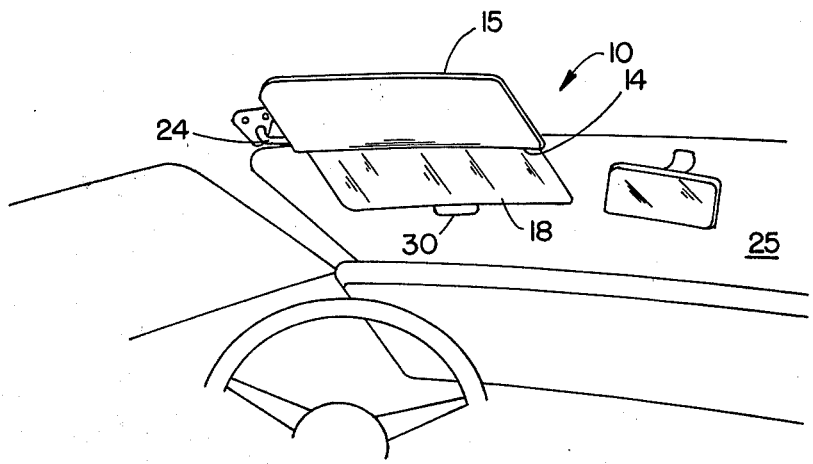
FIG. 4 is a perspective view of the visor and glare shield of the present invention mounted within an automotive vehicle, with the glare shield deployed.

Mounting means for pivotally mounting the visor to the vehicle is provided comprising a conventional wire pivot 24. As best illustrated in FIGS. 3 and 4, the wire pivot 24 mounts the combination visor and glare screen 10 above the windshield 25 of an automotive vehicle. The wire pivot 24 provides for pivoting of the visor 10 about a longitudinal axis 28 directly adjacent and approximately corresponding to the first or top longitudinal edge 14 of the body 11 of the visor 10. The visor 10 is pivotable about the wire 24 upward to a storage position above the windshield of the vehicle and downward to an operative position (illustrated in FIG. 3) to shield the operator's eyes from the sun. With the glare shield extending through the first longitudinal edge 14 of the visor 10 when the visor 10 is pivoted upward to its stored position (illustrated in FIG. 4), the glare shield 18 is slidably deployed downward to an operative position for reducing sun glare. The glare shield 18 is restored to its position within compartment 12 in the body 11 of the visor 10 by sliding the glare shield 18 upwardly into the body 11 of the visor. To facilitate reciprocal movement of the glare shield 18 in and out of the body 11 of the visor 10, a handle 30 is provided.

Figure 5:
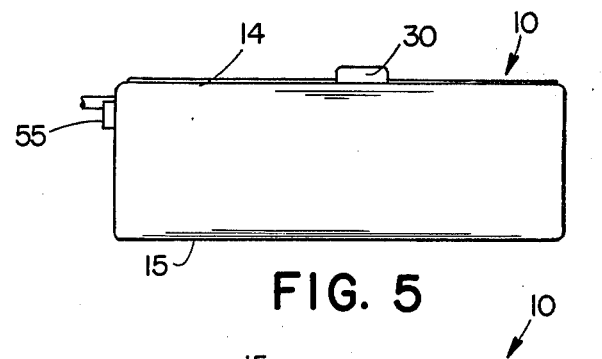
FIG. 5 is an elevational view of the visor and glare shield of the present invention with the visor deployed and the glare screen stored.
Figure 6:
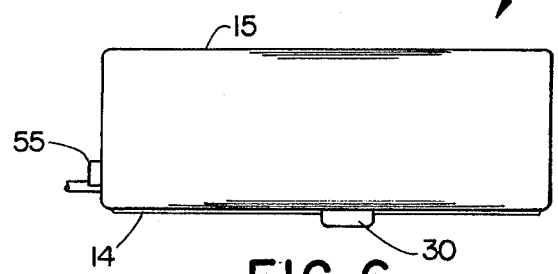
FIG. 6 is an elevational view of the visor and glare screen of the present invention with both the visor and the glare screen in the stored position.
Figure 7:
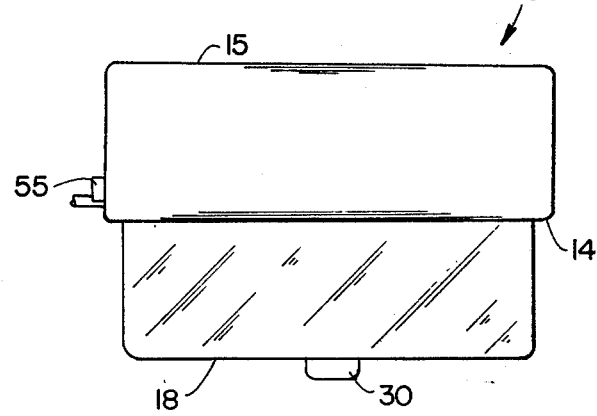
FIG. 7 is an elevational view of a visor and glare screen of the present invention with the visor in the stored position and glare screen in the deployed position.

Referring now to FIGS. 5–7, the sequence of operation of the combination sun visor and glare shield is illustrated in further detail. In FIG. 5, the glare shield is illustrated pivoted downward to an operative position, corresponding to the position illustrated in FIG. 3, where it serves to shield the operator's eyes from sun. In FIG. 6, the visor is illustrated pivoted upward to a stored position. In this position, the handle 30 of the glare shield extends downward and the glare shield is in the proper position for deployment. In FIG. 7, the glare shield has been slid downward to an operative position, corresponding to the position illustrated in FIG. 4, where it shields the operator's eyes from sun glare. A preferable material for the translucent glare shield 18 is a polymeric polarized light filter. As illustrated in the sequence of illustrations 5–7, and perspective views 3 and 4, the visor and glare screen of the present invention are alternately deployable for use independent of one another. When deployed, the visor and glare screen occupy approximately the same position above the operator's eyes, and thus the operator is not required to view the road ahead through the glare screen.

Figure 8:
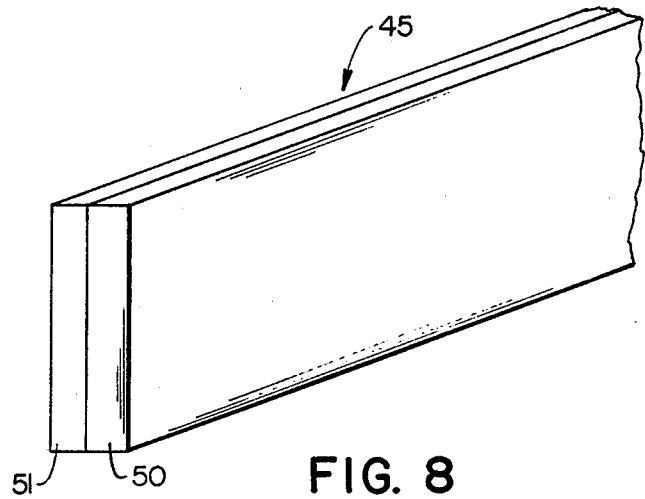
FIG. 8 is a perspective view of a wiper pad of the present invention.

Referring now specifically to FIGS. 1 and 8, it is illustrated that the glare shield further includes wiper means generally indicated by the numeral 40 for cleaning the glare screen during reciprocal movement of the glare screen between stored and deployed positions. More specifically, the wiper means comprises first and second longitudinally extending wiper members 41 and 42. The first and second wiper members 41 and 42 are slidably received in first and second longitudinally extending channels 44 and 45, respectively. First and second channels 44 and 45 are disposed in the opening 20 through which the glare screen 18 extends. The first and second wiper members 41 and 42 are in constant sliding contact with opposing sides of the glare screen 18 for centering the same within the opening 20 thereby assuring that the glare screen 18 is not marred from contact with the visor during reciprocal movement between stored and deployed positions. Preferably, the first and second wiper members 44 and 45 comprise a pair of wiper pads, of which the pad 45 illustrated in FIG. 8 is representative. The pad 45 preferably comprises a first relatively rigid supporting substrate 50 to which a soft wiper pad 51 is secured thereto. The supporting substrate 50 may be a thin layer of metal, a layer of polymeric material or a suitably rigid cardboard material. The wiper pad 51 may be a suitable cloth or paper material that will clean the translucent glare screen 18 during reciprocal movement between stored and deployed positions. Preferably, the first and second wiper pads 44 and 45 are provided with pull tabs 55 illustrated in FIGS. 5–7 which extend from the side of the body 11 of the visor. The pull tabs 55 facilitate insertion and removal of the wiper pads so that the pads may be easily replaced at the end of their useful service life.

Referring now specifically to FIGS. 1 and 2, it is illustrated that the compartment 12 within the body 11 of the combination visor and glare screen 10 is generally rectangular in shape and the glare screen 18 includes a longitudinally extending glide or center block 60. The glide or center block 60 also acts as a stop means for preventing complete removal of glare shield 18 from the compartment 12. The end of glare shield 18 opposite the handle 30 and the first longitudinally extending edge 14 of the body 11 is mounted in and centered in the glide 60. Opposing sides 61 and 62 of the glide 60 are in sliding engagement with opposing, generally parallel side walls 63 and 64, respectively, of the compartment 12. The guide thus ensures that the translucent glare shield 18 does not become marred from contact with the walls 63 and 64 of the compartment 12. Furthermore, when the glare screen 18 is fully deployed from the body 11 of the visor, surface 68 of the glide 60 abuts surface 70 of the compartment 12 to provide a stop defining the limit of extension of the glare shield 18 from the compartment 12.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. An automotive windshield visor and glare screen comprising:
   an opaque windshield visor defining a compartment and first and second longitudinally extending edges;
   an opening in said visor, said opening extending along said first edge of said visor;
   a translucent glare shield slidably received in said compartment;
   mounting means for pivotally mounting said visor about a longitudinally extending axis above the windshield of an automotive vehicle, said mounting means being disposed adjacent said first edge of said visor, said visor being pivotable upward to a storage position and pivotable downward to an operative position for shielding an operator's eyes from the sun;
   said glare shield extending through said first edge of said visor for being slidably deployed downward to an operative position for reducing glare when said visor is pivoted upward in the stored position, and said glare shield being slidable upward to a stored position within said compartment;
   first and second longitudinally extending channels disposed on opposite sides of said opening; and
   first and second longitudinally extending wipers slidably received in said first and second channels, respectively, said first and second wipers being in sliding contact with opposing sides of said glare screen for centering the same in said opening and for cleaning said glare screen during reciprocal movement between stored and deployed positions.

2. The automotive windshield visor and glare screen of claim 1 wherein said glare screen is a polarized light filtering material.

3. The automotive windshield visor and glare screen of claim 1 wherein said first and second wipers are comprised of a relatively rigid supporting substrate with a soft wiper pad secured thereto.

4. The automotive windshield visor and glare screen of claim 1 wherein said first and second wipers include first and second tabs, respectively, said first and second tabs extending from said channels to facilitate insertion and removal of said wiper members in said channels.

5. The automotive windshield visor and glare screen of claim 1 wherein said compartment is generally rectangular and said glare screen includes a longitudinally extending combined stop means and centering block, one edge of said glare screen being centered in said stop means and centering block, said stop means and centering block being in sliding engagement with the walls of said compartment on opposing sides of said glare screen.

* * * * *